(12) United States Patent
Williams et al.

(10) Patent No.: US 7,523,245 B1
(45) Date of Patent: Apr. 21, 2009

(54) COMPACT ISA-BUS INTERFACE

(75) Inventors: Mark Williams, San Jose, CA (US);
Sukalpa Biswas, Sunnyvale, CA (US)

(73) Assignee: Opti, Inc., Mountain View, CA (US)

( * ) Notice: Subject to any disclaimer, the term of this patent is extended or adjusted under 35 U.S.C. 154(b) by 0 days.

(21) Appl. No.: 11/466,222

(22) Filed: Aug. 22, 2006

Related U.S. Application Data

(63) Continuation of application No. 10/306,137, filed on Nov. 27, 2002, now abandoned, which is a continuation of application No. 09/993,964, filed on Nov. 14, 2001, now abandoned, which is a continuation of application No. 09/587,966, filed on Jun. 6, 2000, now abandoned, which is a continuation of application No. 09/233,230, filed on Jan. 19, 1999, now Pat. No. 6,098,141, which is a continuation of application No. 08/595,989, filed on Feb. 6, 1996, now Pat. No. 5,944,807.

(51) Int. Cl.
*G06F 13/00* (2006.01)

(52) U.S. Cl. ............ 710/305; 710/306; 710/4; 710/117; 713/600

(58) Field of Classification Search ......... 710/305–306, 710/3, 240–244, 117, 4, 45; 713/600
See application file for complete search history.

(56) References Cited

U.S. PATENT DOCUMENTS

| | | | |
|---|---|---|---|
| 4,315,308 A | 2/1982 | Jackson | |
| 4,315,310 A | 2/1982 | Bayliss et al. | |
| 4,325,120 A | 4/1982 | Colley et al. | |
| 4,367,524 A | 1/1983 | Budde et al. | |
| 4,402,046 A | 8/1983 | Cox et al. | |
| 4,480,307 A | 10/1984 | Budde et al. | |
| 4,503,535 A | 3/1985 | Budde et al. | |
| 4,750,177 A * | 6/1988 | Hendrie et al. | 714/748 |
| 4,935,868 A * | 6/1990 | DuLac | 710/305 |
| 5,175,820 A * | 12/1992 | Gephardt | 710/14 |
| 5,218,684 A * | 6/1993 | Hayes et al. | 711/219 |

(Continued)

FOREIGN PATENT DOCUMENTS

WO    WO 90/10267    9/1990

OTHER PUBLICATIONS

IEEE Standard 1212-1991, IEEE Standard Control and Status Register (CSR) Architecture for Microcomputer Buses, Jul. 28, 1992, 133 pages.

(Continued)

*Primary Examiner*—Clifford H Knoll
*Assistant Examiner*—Kim T Huynh
(74) *Attorney, Agent, or Firm*—Warren S. Wolfeld; Haynes Beffel & Wolfeld LLP

(57) ABSTRACT

An I/O interface, compatible with industry standards, for interfacing a host to a peripheral device. The interface includes a clock signal, a bus, an address latch enable signal, a peripheral device ready signal, a command signal, a device selected backoff signal, and a reset signal, resulting in an I/O interface capable of ISA-compatible operation with only 22 pins. Address, data, command, interrupt request, and DMA request information are communicated between the host and the peripheral device via a single bus by multiplexing the information on the bus using phasing techniques.

1 Claim, 9 Drawing Sheets

U.S. PATENT DOCUMENTS

| | | | |
|---|---|---|---|
| 5,243,703 | A | 9/1993 | Farmwald et al. |
| 5,319,755 | A | 6/1994 | Farmwald et al. |
| 5,369,748 | A | 11/1994 | McFarland et al. |
| 5,448,742 | A | 9/1995 | Bhattacharya |
| 5,517,624 | A | 5/1996 | Landry et al. |
| 5,531,327 | A | 7/1996 | Darby |
| 5,638,334 | A | 6/1997 | Farmwald et al. |
| 5,710,906 | A | 1/1998 | Ghosh et al. |
| 5,740,385 | A | 4/1998 | Hayek et al. |
| 5,793,990 | A | 8/1998 | Jirgal et al. |
| 5,813,036 | A | 9/1998 | Ghosh et al. |
| 5,841,715 | A | 11/1998 | Farmwald et al. |
| 5,857,117 | A | 1/1999 | Abramson et al. |
| 5,924,119 | A | 7/1999 | Sindhu et al. |
| 5,944,807 | A | 8/1999 | Williams |
| 6,098,141 | A * | 8/2000 | Williams et al. ............ 710/305 |

OTHER PUBLICATIONS

IEEE Standard 1596.5-1993, IEEE Standard for Shared-Data Formats Optimized for Scalable Coherent Interface (SCI) Processors, Jun. 17, 1993, 80 pages.

Intel, MCS-4, Micro Computer Set, Users Manual, Rev. 2, Mar. 1972, 125 pages.

Intel, MCS-4, Micro Computer Set, Users Manual, Rev. 3, Jul. 1972, 120 pages.

Intel, MCS-4, Micro Computer Set, 1972, 12 pages.

Intel, 8008 8-Bit Parallel Central Processing Unit, MCS-8 Micro Computer Set, Rev. 1, Jun. 1972, 59 pages.

Solari, Edward, Theory and Operation, Including PC, XT, AT, ISA and EISA I/O Bus Operation, Annabooks, San Diego, CA Copyright 1992, 77 pages.

"Embedded Intel486 Processor Hardware Reference Manual," Intel Corporation, Jul. 1997, 334 pages.

"PCI Local Bus Specification" Rev. 2.0 (Hillsboro, Oregon, PCI Special Interest Group 1993) 210 pages.

OPTI 82C465MV/MVA/MVB, Single-Chip Mixed Voltage Notebook Solution, Data Book, Rev. 3, Oct. 1997, 284 pages.

Intel, Intel Low Pin Count (LPC) Interface Specification, Rev. 1.1, Aug. 2002, 54 pages.

ISA Bus Technical Summary, Techfest, Dec. 9, 2002, can be found at http://www.techfest.com/hardware/bus/isa.htm, 11 pages.

IEEE Standard 1212.1-1993(2001), IEEE Standard for Communicating Among Processors and Peripherals Using Shared Memory (Direct Memory Access-DMA), 1994, 134 pages.

Solari "At Bus Design" (San Diego, Annabooks, 1990), 106 pages.

IEEE Standard 1596-1992, IEEE Standard for Scalable Coherent Interface (SCI), 1992, 255 pages.

Intel, Low Pin Count (LPC) Interface Specification, Rev. 1.0, Sep. 29, 1997, 39 pages.

OPTi, "FireStar Plus, 64-Bit CPU Single Chip Notebook Solution, Addendum to Preliminary Data Book" Rev. 1.0, Oct. 3, 1997, 158 pages.

OPTi, "FireStar/FireStar ACPI, 64-Bit CPU Single Chip Notebook Solution, Preliminary Data Book," Rev. 1.0, Feb. 28, 1997, 424 pages.

Intel, "8237A High Performance Programmable DMA Controller (8237A-5)." Datasheet Sep. 1993, 19 pages.

IEEE Standard Digital Interface for Programmable Instrumentation (Std 488.2-1987) Jun. 11, 1987, 207 pages.

IEEE Standard Specifications for an I/O Expansion Bus: SBX Bus (Std 959-1988), Jun. 9, 1988, 41 pages.

IEEE Standard Microcomputer System Bus (Std 796-1983), Dec. 9, 1982, 50 pages.

Opti-386/486WB EISA Chipset 82C681/82C682/82C686/82C687 (EBC/MCC/ISP/DBC Databook Preliminary, v 1.3 1992, 130 pages.

Draft ANSI Standard X3T10, 791D, Rev. 4C, Information Technology, AT Attachment Interface for Disk Drives, 1994, 76 pages.

PC Card Standard Rev. 2.0, PCMCIA (Sunnyvale, CA 1991), 172 pages.

* cited by examiner

| Phase | MAD 15 | MAD 14 | MAD 13 | MAD 12 | MAD 11 | MAD 10 | MAD 9 | MAD 8 | MAD 7 | MAD 6 | MAD 5 |
|---|---|---|---|---|---|---|---|---|---|---|---|
| 1 | A23 | A22 | A21 | A20 | A19 | A18 | A17 | A16 | A15 | A14 | A13 |
| 2 | A9 | A8 | A7 | A6 | A5 | A4 | A3 | A2 | A1 | A0 | Same |
| 3 | D15 | D14 | D13 | D12 | D11 | D10 | D9 | D8 | D7 | D6 | D5 |

| Phase | MAD 4 | MAD 3 | MAD 2 | MAD 1 | MAD 0 |
|---|---|---|---|---|---|
| 1 | A12 | A11 | A10 | I/D#=0 | MIO#=1 |
| 2 | Same | Same | ISA# | SBHE# | W/R# |
| 3 | D4 | D3 | D2 | D1 | D0 |

| Phase | MAD 15 | MAD 14 | MAD 13 | MAD 12 | MAD 11 | MAD 10 | MAD 9 | MAD 8 | MAD 7 | MAD 6 | MAD 5 |
|---|---|---|---|---|---|---|---|---|---|---|---|
| 1 | A9 | A8 | A7 | A6 | A5 | A4 | A3 | A2 | A15 | A14 | A13 |
| 2 | Same | Same | Same | Same | Same | Same | Same | Same | A1 | A0 | Same |
| 3 | D15 | D14 | D13 | D12 | D11 | D10 | D9 | D8 | D7 | D6 | D5 |

| Phase | MAD 4 | MAD 3 | MAD 2 | MAD 1 | MAD 0 |
|---|---|---|---|---|---|
| 1 | A12 | A11 | A10 | I/D#=1 | MIO#=1 |
| 2 | Same | Same | ISA#=0 | SBHE# | W/R# |
| 3 | D4 | D3 | D2 | D1 | D0 |

| Phase | MAD 15 | MAD 14 | MAD 13 | MAD 12 | MAD 11 | MAD 10 | MAD 9 | MAD 8 | MAD 7 | MAD 6 | MAD 5 |
|---|---|---|---|---|---|---|---|---|---|---|---|
| 1 | A23 | A22 | A21 | A20 | A19 | A18 | A17 | A16 | A15 | A14 | A13 |
| 2 | A9 | A8 | A7 | A6 | A5 | A4 | A3 | A2 | A1 | A0 | DMX2 |
| 3 | D15 | D14 | D13 | D12 | D11 | D10 | D9 | D8 | D7 | D6 | D5 |

| Phase | MAD 4 | MAD 3 | MAD 2 | MAD 1 | MAD 0 |
|---|---|---|---|---|---|
| 1 | A12 | A11 | A10 | I/D#=0 | MIO#=1 |
| 2 | DMX1 | DMX0 | TC | SBHE# | W/R# |
| 3 | D4 | D3 | D2 | D1 | D0 |

| Phase | MAD 15 | MAD 14 | MAD 13 | MAD 12 | MAD 11 | MAD 10 | MAD 9 | MAD 8 | MAD 7 | MAD 6 | MAD 5 |
|---|---|---|---|---|---|---|---|---|---|---|---|
| 1 | BRD=1 | STP#=0 | CC2 | CC1 | CC0 | Rsvd | Rsvd | Rsvd | Rsvd | Rsvd | Rsvd |
| 2 | Same | Same | Same | Same | Same | Same | Same | Same | Same | Same | Same |
| 3 | Same | Same | Same | Same | Same | Same | Same | Same | Same | Same | Same |

| Phase | MAD 4 | MAD 3 | MAD 2 | MAD 1 | MAD 0 |
|---|---|---|---|---|---|
| 1 | Rsvd | Rsvd | Rsvd | I/D#=1 | MIO#=1 |
| 2 | Same | Same | ISA#=1 | SBHE#=0 | W/R#=1 |
| 3 | Same | Same | Same | Same | Same |

| Phase | MAD 15 | MAD 14 | MAD 13 | MAD 12 | MAD 11 | MAD 10 | MAD 9 | MAD 8 | MAD 7 | MAD 6 | MAD 5 |
|---|---|---|---|---|---|---|---|---|---|---|---|
| IRQ | IRQ15 | IRQ14 | IRQ13 | IRQ12 | IRQ11 | IRQ10 | IRQ9 | IRQ8 | IRQ7 | IRQ6 | IRQ5 |
| DRQ | EN7# | EN6# | EN5# | Rsvd | EN3# | EN2# | EN1# | EN0# | DRQ7 | DRQ6 | DRQ5 |

| Phase | MAD 4 | MAD 3 | MAD 2 | MAD 1 | MAD 0 |
|---|---|---|---|---|---|
| IRQ | IRQ4 | IRQ3 | IRQ2 | IRQ1 | IRQ0 |
| DRQ | Rsvd | DRQ3 | DRQ2 | DRQ1 | DRQ0 |

COMPACT ISA-BUS INTERFACE

This application is a Continuation of application Ser. No. 10/306,137 filed on 27 Nov. 2002, which is a continuation of application Ser. No. 09/993,964 filed on 14 Nov. 2001, which is a continuation of application Ser. No. 09/587,966, filed on 6 Jun. 2000, which is a continuation of application Ser. No. 09/233,230 filed on 19 Jan. 1999, now U.S. Pat. No. 6,098,141, which is a continuation of application Ser. No. 08/595,989 filed on 6 Feb. 1996, now U.S. Pat. No. 5,944,807.

BACKGROUND OF THE INVENTION

1. Field of the Invention

The invention relates to IBM PC AT-compatible computer architectures, and more particularly to I/O interfaces for communicating with peripheral devices.

2. Description of Related Art

The IBM PC AT-computer architecture has become an industry standard architecture for personal computers. The typical IBM PC AT-compatible computer includes an I/O bus, sometimes referred to in these systems as an AT bus. Such a bus is used to interface communications between a host and a peripheral device, or communications between peripheral devices and host memory.

The most commonly used I/O bus is the industry standard architecture (ISA) bus. The ISA bus was adopted by several computer industry groups to create a standard to permit the development of compatible add-on cards in a reasonable and consistent fashion. The ISA bus includes 8 or 16 data lines in a data bus, address lines in an address bus distinct from the data bus, as well as distinct control and command lines.

The various signals on the ISA bus are well specified and well known in the industry. General information on the ISA bus can be found in Solari, "AT Bus Design" (San Diego, Annabooks, 1990), incorporated by reference herein. For present purposes, the following signals are important:

| | |
|---|---|
| SA(23:0) | 24 address lines. |
| BALE | Bus address latch enable line. In a CPU initiated I/O bus cycle, this line indicates when the SA address, AEN and SBHE# lines are valid. In other I/O bus cycles, the platform circuitry drives BALE high for the entire cycle. |
| SBHE# | System byte high enable. When SBHE# is active and SA(0) is low, then a 16-bit access will be performed. |
| AEN | Address enable line. When active, informs I/O resources on I/O bus to ignore the address and I/O command signals. Used primarily in DMA cycles where only the I/O resource which has requested and received a DMA acknowledgment signal (DACK#) knows to ignore AEN and respond to the I/O signal lines. |
| SD(15:0) | 16 data lines. |
| MEMR#, SMEMR# | Read request lines to a memory resource on the I/O bus. SMEMR# is the same as MEMR# except that SMEMR# becomes active only when the read address is below 1MB (i.e., SA(23:20) = 0). Also called MRDC# and SMRDC#, respectively, or MRD# and SMRD#, respectively. |
| MEMW# SMEMW# | Write request lines to a memory resource on the I/O bus. SMEMW# becomes active only when the write address is below 1 MB. Also called MWTC# and SMWTC#, respectively, of MWR# and SMWR#, respectively. |
| IOR# | Read request line to an I/O resource on the I/O bus. Also called IORC# or IORD#. |
| IOW# | Write request line to an I/O resource on the I/O bus. Also called IOWC# or IOWR#. |
| MEMCS16# | Memory chip select 16. Asserted by an addressed memory resource on the I/O bus if the resource can support a 16-bit memory access cycle. Also called M16#. |
| IOCS16# | I/O chip select 16. Asserted by an addressed I/O resource on the I/O bus if the resource can support a 16-bit I/O access cycle. Also called IO16#. |
| SRDY# | Synchronous Ready line. Also sometimes called 0WS#, NOWS# or ENDXFR#. Activated by an addressed I/O resource to indicate that it can support a shorter-than-normal access cycle. In an ISA system, only the platform CPU can execute a no-wait-state cycle. |
| IOCHRDY | I/O channel ready line. If this line is deactivated by an addressed I/O resource, the cycle will not end until it is reactivated. A deactivated IOCHRDY supersedes an activated SRDY#. Also sometimes called CHRDY. |
| RESET | Minimum pulse width of 1 microsecond. |
| IRQ(15, 14, 12:9, 7:3) | Interrupt request lines to interrupt controller for CPU. |
| DRQ(7:5, 3:0) | DMA Request lines from I/O resource on I/O bus to platform DMA controller. |
| DACK(7:5, 3:0) | DMA Acknowledge lines. |
| TC | DMA terminal count signal. Indicates that all data has been transferred. Also called T/C. |
| BCLK | I/O bus clock signal. 6-8.33 MHz square wave. |

Recently, efforts have been made to develop other bus protocols for PC AT-compatible computers with the goals of reducing the size of PC AT-compatible computers as well as continued industry standardization. These efforts have included the development of the PCI local bus as well as the PCMCIA bus.

The PCI local bus has been developed to establish an industry standard for local bus architectures, particularly those interfacing with high bandwidth functions. The PCI local bus is described in detail in "PCI Local Bus Specification", Revision 2.0 (Hillsboro, Oreg., PCI Special Interest Group, 1993), incorporated by reference herein. The PCI local bus attempts to reduce the number of pins required for a local bus design by multiplexing address information and data information onto a single address-data bus. However, the PCI local bus still requires a minimum of 47 pins to provide adequate communication between a processor and local components, with its address-data bus comprising 32 of those pins and various command information comprising at least 4 pins. Further, because the PCI bus was designed primarily to support high-end peripherals, it is not as economical to manufacture low-end peripherals for the PCI-bus as it is for the older, slower, ISA-bus.

The PCMCIA bus has been developed to promote the interchangeability of integrated circuit cards among a variety of computer types and products, including IBM PC-compatible systems. The PCMCIA bus is described in detail in Personal Computer Memory Card Int'l Assoc. (PCMCIA) "PC Card Standard", Revision 2.0 (Sunnyvale, Calif., 1991), incorporated by reference herein. The PCMCIA bus attempts to reduce the size of the I/O interface by miniaturizing the connector. However, PCMCIA does little toward actually reducing the number of pins required to utilize its bus over ISA. The PCMCIA connector requires 68 pins, including 26 pins for addressing functions and 16 separate pins for data.

Therefore, despite these attempts to develop other bus protocols, the ISA bus interface remains one of the most widely used and accepted I/O bus architectures. While it is important from an interfacing perspective to maintain the industry standards to maintain overall system compatibility for various add-on cards designed in compliance with industry standards, it is also desirable to reduce the pin counts on interface connectors, and thus reduce the size of PC AT-compatible computers and their add-on peripheral devices.

SUMMARY OF THE INVENTION

The present invention, roughly described, is directed to an interface to be used between a host device and one or more peripheral devices. It is desirable to create an interface with a reduced pin count from that of the conventional ISA bus interface but that can co-exist with and not interfere with standard ISA operations.

To reduce the pin count on an interface connector, the interface according to the present invention, roughly described, eliminates the multiple and distinct buses which are conventionally required to support distinct functions, including addressing functions, data transfers, interrupt requests, DMA requests, and DMA acknowledge-type communications. Rather, an aspect of the present invention (hereafter referred to as "compact ISA" or "CISA") is the utilization of a single bus structure to transfer address, data, interrupt request, DMA request, and DMA acknowledge information. Using phasing techniques, the CISA interface multiplexes the different types of information onto the single bus. For instance, in one cycle, address information may be driven onto the bus for a time period, an "address phase," followed by data information in a "data phase". In another cycle, interrupt request information may be driven onto the bus during an interrupt request phase followed by DMA request information in a DMA request phase.

In addition to eliminating the extensive number of pins required to support multiple buses, CISA further eliminates other signals commonly used in ISA interface structures. For instance, CISA does not use distinct signal lines for carrying IORD#, IOWR#, MRD#, MWR#, SMEMR#, SMEMW#, SBHE#, SRDY#, AEN, IOCS16#, MEMCS16# and TC. Rather, in an embodiment of the invention, CISA combines some of these signals into a new signal (discussed below), or multiplexes some of these signals on the address-data bus along with address and data information.

Other aspects of the invention, roughly described, are the addition of two signals not present on the ISA bus interface. The first signal is a command indication signal (CMD#), which, in its simplest form, is the AND of the IORD#, IOWR#, MRD# and MWR# commands on the ISA bus interface. The second signal added is a device selected/AT bus backoff request, SEL#/ATB#, which indicates in one mode of operation that a peripheral device claims the current cycle and, in a second mode of operation, that the host should inhibit its bus operations. The SEL#/ATB# signal is also asserted asynchronously to restart the clock if the peripheral device is engaged in a stop clock, or low power, mode.

Thus, in one embodiment of the invention, the total requirement of connector pins required for the CISA interface is 22 pins, for a reduction of 58 pins over ISA.

BRIEF DESCRIPTION OF THE DRAWINGS

The invention will be described with respect to particular embodiments thereof, and reference will be made to the drawings, in which.

DETAILED DESCRIPTION

Figure 1:
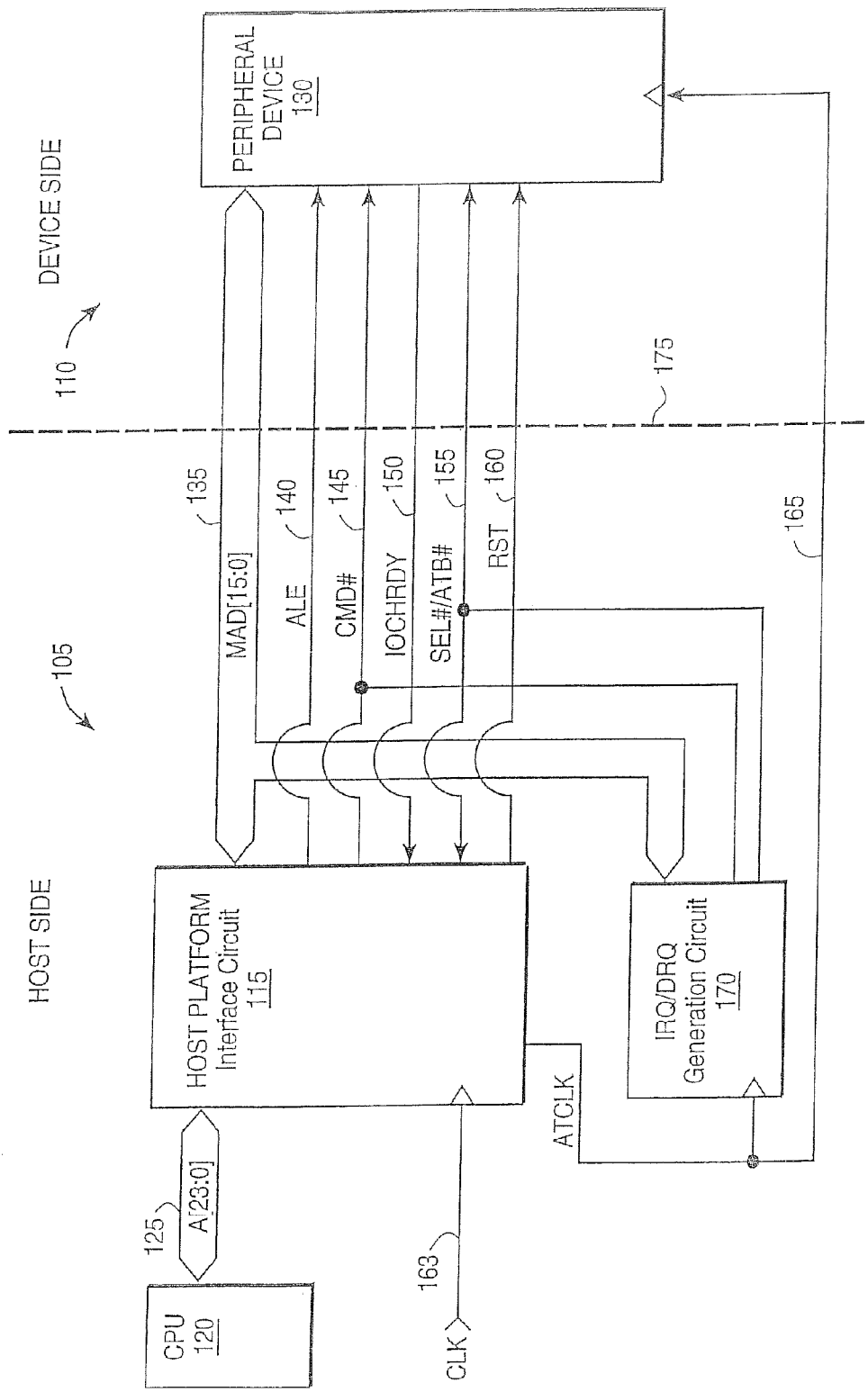
FIG. 1 is a functional block diagram of an interface in accordance with the present invention.

FIG. 1 is an overall block diagram of a complete system incorporating a CISA interface according to the invention. FIG. 1 shows a host side 105 and a device side 110 of an interface 175. On the host side 105 is host platform interface circuitry 115 coupled to CPU 120 via a CPU bus 125. Host platform interface circuitry 115 communicates address, data, interrupt request, and DMA request information to/from a peripheral device 130 via a bidirectional address-data bus, MAD[15:0] 135 crossing the interface 175. In addition to the address-data bus 135 being coupled between the host platform interface circuitry 115 and the peripheral device 130, other signals, as described in Table 1 below, ALE 140, CMD# 145, IOCHRDY 150, SEL#/ATB# 155 and RST 160, are coupled between host platform interface circuitry 115 and peripheral device 130. A clock signal line CLK 163 is provided to host platform interface circuitry 115 by other circuitry (not shown). ATCLK 165 is driven by host platform interface circuitry 115, and is coupled to clock inputs of both host platform interface circuitry 115 and across the interface 175 to peripheral device 130. A dashed line 175 indicates the interface, which in the present embodiment comprises a 22 pin pinout. In other embodiments of the invention, dashed line 175 may indicate a 22-pin connector or a 40-pin cable in which the extra pins are grounded or unused. Also included is IRQ/DRQ generation circuitry 170, which is coupled to the address-data bus 135, CMD# 145 and SEL#/ATB# 160, and is further discussed below.

The complete CISA interface signal set is shown in Table 1 below. Note that some of the signals described in this specification are asserted high, whereas others are asserted low. As used herein, signals which are asserted low are given a '#' suffix in their names, whereas those asserted high (or for which an assertion polarity has no meaning) lack a '#' suffix.

TABLE 1

Compact ISA (CISA) Interface Signals

| Line | Direction (Viewed from Peripheral Side) | Description |
|---|---|---|
| MAD[15:0] | I/O | Multiplexed bus used to transfer address, command, data, IRQ, DRQ, DACK information. |
| ATCLK | I | Standard ISA-bus clock signal line. |
| ALE | I | Standard ISA-bus address latch enable. CISA peripheral device uses rising edge of ALE to latch the second (address and command) phase. CISA host uses falling edge of ALE to latch SEL# from peripheral device and to indicate termination of the second address phase. |
| CMD# | I | Command indication. Common to host and all devices on the CISA bus. The CISA host asserts CMD# during the data phase of the cycle to time the standard ISA command (IORD#/WR#, MRD#/WR#), and also asserts CMD# to acknowledge SEL#/ATB#. |
| SEL#/ATB# (also CLKRUN#) | O tri-state | Device selected/ISA-bus backoff request. Common to all peripheral devices on the CISA bus. When ALE is high the CISA device asserts SEL# to indicate to the host that it is claiming the cycle. When ALE is low, the CISA device drives this signal to indicate that it has an interrupt and/or DMA request to make; the host acknowledges by asserting CMD#. If in a stop clock cycle, peripheral device can assert this signal asynchronously to restart the clock. |
| IOCHRDY | O OD | Standard ISA-bus cycle extension request signal during memory and I/O cycles. |
| RST | I | Standard ISA-bus reset signal. |

In operation, the CISA interface typically operates in two different modes. In the first mode of operation, the CISA interface is able to perform memory access cycles, I/O access cycles, configuration cycles, or DMA acknowledge cycles. In the second mode of operation, the CISA interface is able to perform interrupt and DMA request drive-back cycles. Each of these modes will be discussed in turn.

Mode 1—Memory, I/O, Configuration, DMA Acknowledge Cycles

During mode-1 type cycles, address and data information are multiplexed onto the address-data bus, resulting in at least one address phase and at least one data phase. Often, an address will be composed of more than 16 bits (the width of the address data bus 135 shown in FIG. 1). In such instances, two address phases are used to convey a complete address followed by a data phase. The two address phases are sometimes referred to herein as two address "sub-phases" of a single address "phase." Were data information to be composed of more than 16 bits, multiple data sub-phases could also be utilized. However, the present embodiment uses two address sub-phases and one data phase for a total of three phases.

The low order three bits of the multiplexed address-data bus, MAD[2:0], are reserved in the first two phases (the address phases) of each mode-1 cycle to define the cycle and to provide several commands which are typically provided by signal lines separate from an address or data bus in other conventionally used I/O interfaces. Bit usage for these three bits of the MAD bus are shown in Table 2 below.

TABLE 2

Common MAD Bit Usage

| Signal | Phase 1 | Phase 2 |
|---|---|---|
| MAD0 | ISA-bus M/IO# indication bit; used to determine address space selection. M/IO# = 1 to indicate that the address is in the memory address space, M/IO# = 0 to indicate that the address is in the I/O address space. M/IO# = 1 is also used to indicate a configuration cycle when I/D# = 1. | ISA-bus W/R# indication bit |
| MAD1 | I/D# indication bit. It is always 0 if M/IO# = 1 (indicating a memory cycle), and selects between I/O (I/D# = 1) and DMA (I/D# = 0) cycles if M/IO# = 0. I/D# = 1 is also used to indicate a configuration cycle when M/IO# = 1. | ISA-bus SBHE# indication bit. |
| MAD2 | Usage varies. | ISA# timing indication bit; ISA# = 1 to indicate fast CISA timing (no-wait-states possible); ISA# = 0 to indicate standard ISA-compatible timing. |

A. Memory Access Cycles.

Figures 2A, 2B:
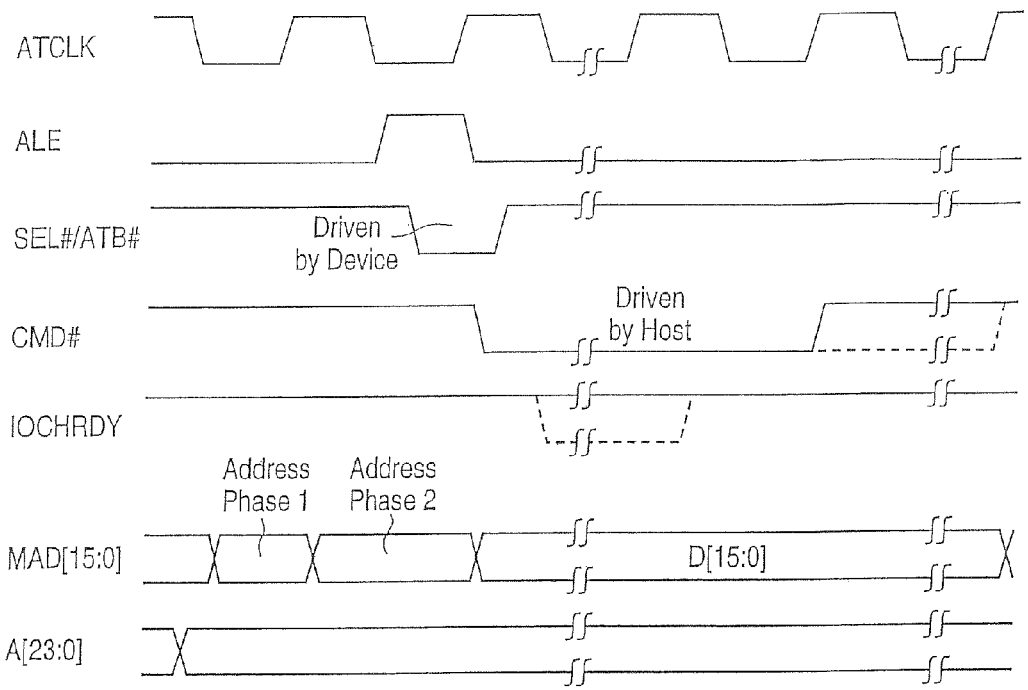
FIG. 2a is a timing diagram showing the operation of the interface of FIG. 1 for performing a memory cycle with standard timing.
FIG. 2b is a chart showing bit definitions for bus 135 of FIG. 1 in a memory access cycle with either fast or standard timing.

A memory access cycle using ISA-compatible timing is shown in FIG. 2a, which is discussed with reference to FIG. 1. FIG. 2b is a table showing bit information for each MAD line in each of the three phases of the cycle. Host platform interface circuitry 115 gets address information from CPU 120 via bus 125, A[23:0], as well as cycle definition and command information (e.g., M/IO#, W/R#, SBHE#) from either CPU 120 or an ISA controller (not shown). In the first address phase, host platform interface circuitry 115 drives out A[23:10] on MAD[15:2]. Concurrently, host platform interface circuitry 115 drives out cycle definition information, including cycle type (I/D#=0) on MAD[1], and address space selection (M/IO#=1) on MAD[0], as shown in FIG. 2b. Peripheral device 130 then latches MAD[15:0] (address and cycle information) on the rising edge of ATCLK and decodes the information.

In the second address phase, host platform interface circuitry 115 drives out the remaining address information, A[9:0], as well as remaining command information, ISA# (=0 for standard timing), SBHE#, and W/R# as shown in FIG. 2b. Note in FIG. 2b that when all bits on the MAD bus are not required to be used, unused bits retain whatever value they had in the previous phase. Host platform interface circuitry 115 asserts ALE. The peripheral device latches the address and command information from MAD[15:0] on the rising edge of ALE. If the cycle belongs to a CISA peripheral device, then peripheral device 130 asserts SEL#. Host platform interface circuitry 115, and any other CISA devices coupled to the interface, recognize the SEL# function of SEL#/ATB# by seeing ALE high on sampling SEL#/ATB# low on the rising edge of ATCLK. Host platform interface circuitry 115 then de-asserts ALE on the rising ATCLK edge.

During the data phase of a memory access cycle, for reads, host platform interface circuitry 115 tri-states its MAD[15:0] outputs. For writes, host platform interface circuitry 115 drives write data onto MAD[15:0]. For reads and writes, host platform interface circuitry 115 asserts CMD# synchronously with the rising edge of ATCLK. Host can also optionally inhibit its ISA MRD#/MWR# lines, preventing bus contention with ISA devices (i.e., only one device will then be able to return data) Peripheral device 130 can bring IOCHRDY low asynchronously after CMD# goes active to extend the cycle further. When peripheral device 130 is ready to end the cycle, it brings IOCHRDY high asynchronously to allow cycle completion. Host platform interface circuitry 115 will then de-assert CMD# on the next rising edge of ATCLK after the rising ATCLK edge on which it sampled IOCHRDY high. (As used herein, a signal which is said to shift to a different logic level "synchronously" with a particular edge of ATCLK, does so in response to such particular edge and does so sufficiently in advance of the next ATCLK edge of the same polarity to meet set-up and hold requirements.)

Figure 3:
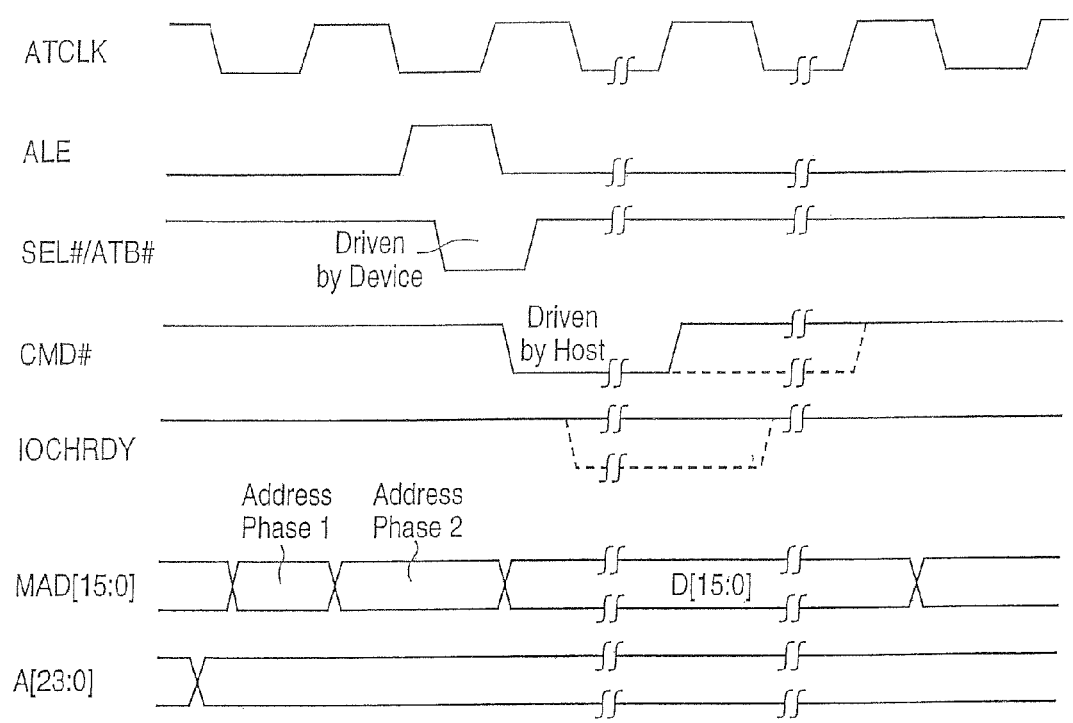
FIG. 3 is a timing diagram showing the operation of the interface of FIG. 1 for performing a memory access cycle with fast timing.

During memory access cycle operation, the CISA interface is also capable of fast timing, or "no-wait-state" operation. FIG. 3 depicts a CISA memory cycle with fast CISA timing. The address phases are identical to those of a memory cycle with standard timing except that ISA# (MAD[2] in the second address phase) is driven to a logical high to indicate fast timing. The data phase of a fast memory cycle, however, utilizes different timing than a standard timing memory cycle. For reads, host platform interface circuitry 115 tri-states its MAD[15:0] outputs, and for writes, host platform interface circuitry 115 drives write data onto MAD[15:0]. Host platform interface circuitry 115 asserts CMD# synchronously with the rising edge of ATCLK. Host can also optionally inhibit its ISA MRD#/MWR# lines. Peripheral device 130 can bring IOCHRDY low asynchronously after CMD# goes active to extend the cycle further, and, in the present embodiment, must de-assert IOCHRDY immediately upon receiving CMD# if it desires to lengthen the cycle. When peripheral device 130 is ready to end the cycle, it brings IOCHRDY high synchronously with the falling edge of ATCLK to allow cycle completion. Host platform interface circuitry 115 will then de-assert CMD# on the same rising edge of ATCLK where it samples IOCHRDY high.

B. I/O Access Cycles.

Figures 4A, 4B:
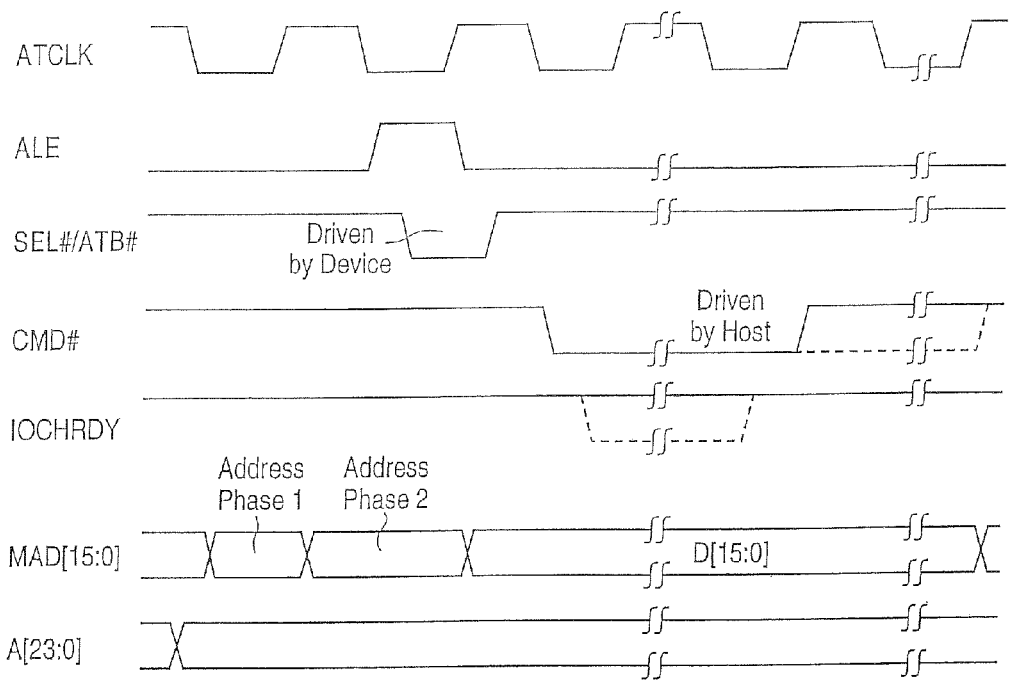
FIG. 4a is a timing diagram showing the operation of the interface of FIG. 1 for performing an I/O access cycle.
FIG. 4b shows bit definitions for bus 135 of FIG. 1 during an I/O access cycle.

A CISA I/O access cycle is shown in FIG. 4a. I/O cycle timing is identical to that for a memory cycle with standard timing. In an I/O cycle, however, I/D# (MAD[1]) in the first address phase) will be driven to a logical high and M/IO# (MAD[0] in the first address phase) will be driven to a logical low, as shown in Table 2 and FIG. 4b. In addition, rather than inhibiting the ISA MRD#/MWR# signals, the host can optionally inhibit its ISA IOR#/IOW# lines to prevent two devices from simultaneously accessing the same address space.

Because I/O cycles cannot be made "no-wait-state" on the conventional ISA bus, they have also been defined on the CISA bus as "no-wait-state" by default to maintain compatibility with ISA devices. However, in an embodiment accessing a CISA peripheral device or other device capable of fast timing, I/O cycles are made "no-wait-state" in a manner similar to that done for fast memory cycles, i.e., driving MAD[2] to a logical high to indicate fast timing.

C. DMA Cycles.

Two situations arise with respect to DMA operations. The first situation is a DMA transfer between an ISA DMA device and any memory device, including system DRAM, ISA memory, or CISA memory. The second situation is a DMA transfer between a CISA DMA (I/O) device and memory (CISA or non-CISA). Thus, the CISA host platform interface circuitry 115 must distinguish between the DMA channels on the ISA bus and those on the CISA bus, and does so according to whether it has latched DRQ active for a particular channel for a CISA drive-back cycle (described below).

In the first DMA situation, where a transfer occurs between an ISA DMA device and any memory device, the host platform interface circuitry 115 runs a standard CISA memory cycle (shown in FIGS. 3 and 2b) along with an ISA I/O cycle (not shown). If the memory device is a CISA memory device, the memory device responds with SEL# and the host must deassert ALE.

Figures 5A, 5B:
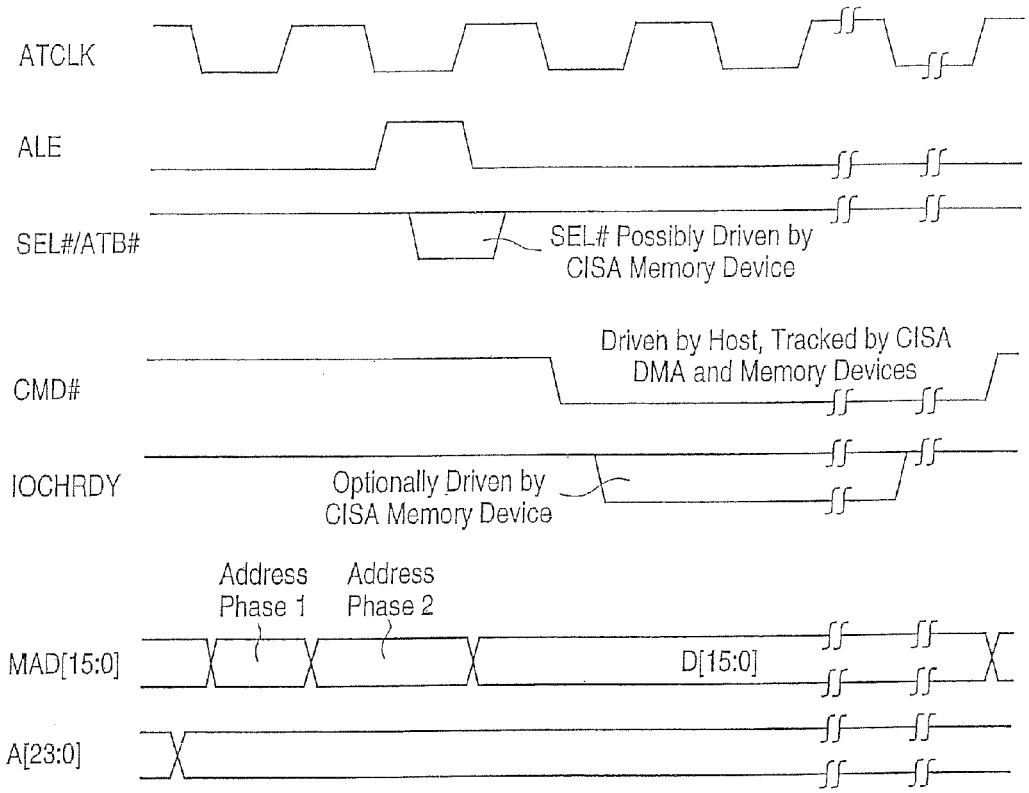
FIG. 5a is a timing diagram showing the operation of the interface of FIG. 1 for performing a DMA acknowledge cycle.
FIG. 5b shows bit definitions on bus 135 of FIG. 1, during a DMA acknowledge cycle.

In the second DMA situation, where a transfer occurs between a CISA DMA (I/O) device and a memory, a DMA acknowledge cycle is initiated and is shown in FIG. 5a. Host platform interface circuitry 115 gets address information from CPU 120 via bus 125, A[23:0], as well as cycle definition and command information (e.g., M/IO#, W/R#, SBHE#) from either CPU 120 or an ISA controller (not shown). In the first address phase, host platform interface circuitry 115 drives out A[23:10] on MAD[15:2]. Concurrently, host platform interface circuitry 115 drives out cycle definition information, I/D#=0 on MAD[1] and M/IO#=0 on MAD[0], as shown in FIG. 5b. CISA DMA device and CISA memory device (both considered peripheral devices and not shown separately) then latch MAD[15:0] (address and cycle information) on the rising edge of ATCLK and decode the information.

In the second address phase, host platform interface circuitry 115 drives out remaining address information (A[9:0]), channel information (DMX[2:0]), TC (terminal count), and remaining command information (SBHE#, and W/R#), as shown in FIG. 5b. Note that SBHE# and W/R# reference the memory device and not the I/O device, which assumes the opposite sense of W/R# for its portion of the cycle. Host platform interface circuitry 115 asserts ALE. Because the host platform interface circuitry 115 has already determined that the cycle belongs to a CISA device, the host platform interface circuitry 115 does not need to see SEL# and the CISA DMA device does not assert SEL# for the I/O portion of the cycle, but does latch the address and command information from MAD[15:0] on the rising edge of ATCLK. CISA memory device also latches address and command information, but the CISA memory device asserts SEL#. Were the CISA DMA (I/O) device to assert SEL#, contention would arise with the CISA memory device which must, in the present embodiment, respond with SEL# during the memory portion of the cycle. Host platform interface circuitry 115 then de-asserts ALE on the rising ATCLK edge.

During the data phase of the DMA acknowledge cycle, host platform interface circuitry 115 tri-states its MAD[15:0] outputs for DMA writes (i.e., I/O read, memory write), and for DMA reads (i.e., I/O write, memory read), host platform interface circuitry 115 drives write data onto MAD[15:0]. For reads and writes, host platform interface circuitry 115 asserts CMD# synchronously with the falling edge of ATCLK and must inhibit its ISA IOR#/IOW# lines. In the present embodiment, CISA DMA device may not extend a DMA acknowledge cycle with IOCHRDY, but CISA memory devices may de-assert IOCHRDY. Host platform interface circuitry 115 will de-assert CMD# synchronously with the rising edge of ATCLK.

D. Configuration Cycles.

Figures 6A, 6B:
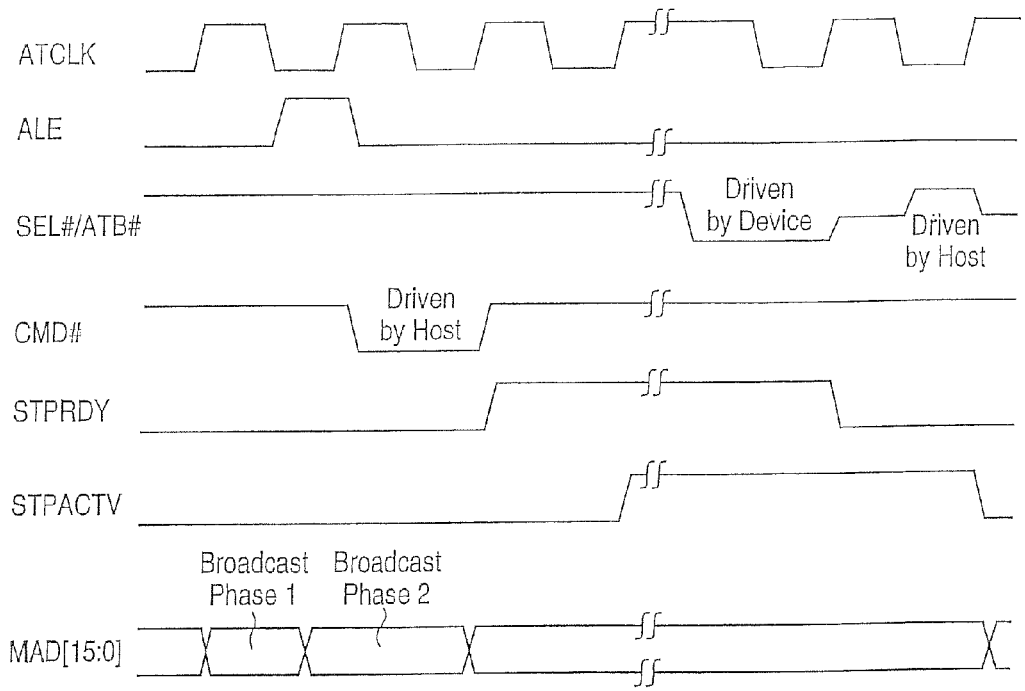
FIG. 6a is a timing diagram showing the operation of the interface of FIG. 1 for performing a stop clock broadcast configuration cycle.
FIG. 6b shows bit definitions on bus 135 of FIG. 1 during a stop clock broadcast configuration cycle.

One type of configuration cycle is a broadcast cycle, and one type of broadcast cycle is a stop clock cycle, which is shown in FIG. 6a. A stop clock cycle indicates that the host platform interface circuitry 115 will immediately put the CISA peripheral device 130 into a low-power mode in which peripheral device 130 will no longer receive clocks. Therefore, the peripheral device 130 must enter into a state in which it can asynchronously signal that it needs the clocks restarted, for instance, if it needed to generate an interrupt to the system.

Referring to FIGS. 6a and 6b, the host platform interface circuitry 115 initiates the stop clock cycle by driving out command and cycle information in phase 1 of the cycle. This command and cycle information includes BRD=1 to indicate a broadcast cycle, STP#=0 to indicate a stop cycle, CC[2:0] which are clock count bits indicating how many rising clock edges the peripheral device 130 should expect after CMD# goes high before the clock is stopped, I/D#=1, and M/IO#=1. In the present embodiment, other bits on the MAD bus have been reserved. Peripheral device 130 then latches this information on the rising edge of ATCLK.

In the second phase, host platform interface circuitry drives out remaining command information, including ISA#=1 indicating fast timing (no-wait-state), SBHE#=0 to indicate 16 bits of data, and W/R#=1 because a stop clock cycle will always be a write cycle. Host platform interface circuitry 115 asserts ALE and peripheral device latches the remaining information. Peripheral device 130 does not assert SEL#, in the present embodiment.

Host platform interface circuitry asserts CMD# synchronously with the rising edge of ATCLK. Once host de-asserts CMD#, peripheral device 130 is internally in a stop-ready (STPRDY) state. After the number of clocks specified by CC[2:0], the host platform interface circuitry stops the clock, in one embodiment, in its high state. In an alternative embodiment, the host platform interface circuitry stops the clock in its low state. In FIG. 6a, CC[2:0]=001, and the clock is brought high by host platform interface circuitry on the next rising ATCLK edge. Each additional count requires the host platform interface circuitry 115 to wait one more clock cycle before stopping the clock.

While in the STPRDY state, peripheral device 130 also counts clocks and it enters into a stop active (STPACTV) state on the specified clock edge (in FIG. 6a, after 001 clock edges). Once in the STPACTV state, SEL#/ATB# has a third meaning: Clock Run (CLKRUN#). Peripheral device 130 can assert CLKRUN# asynchronously at any time while in the STPACTV state to signal host platform interface circuitry to restart its clock, for instance if peripheral device 130 needs to assert an interrupt request to the host.

After CLKRUN# (SEL#/ATB#) has been asserted, on the next rising edge of ATCLK, peripheral device 130 deasserts CLKRUN# but does not drive it high. Peripheral device 130 has, at this point, left the STPRDY state, but still remains in the STPACTV state and still cannot initiate or respond to any cycles. On the next falling ATCLK edge, host platform interface circuitry 115 drives SEL#/ATB# high for half an ATCLK cycle, and on the next rising ATCLK edge, host platform interface circuitry 115 stops driving SEL#/ATB#. Peripheral device 130 leaves the STPACTV state and can generate or respond to cycles. Note in FIG. 6b that the MAD bus in the data phase of the stop clock cycle contains no useful data and is not latched.

Mode 2—Interrupt and DMA Request Drive Back Cycles.

In order to enter the second mode of operation, peripheral device 130 must sample SEL#/ATB# and CMD# high, and ALE low, on two consecutive edges of ATCLK. The peripheral device 130 will assert ATB# on a rising edge of ATCLK. At this point, in the present embodiment, the peripheral device 130 can only drive two types of information onto the bus: interrupt requests and DMA requests. Thus, rather than the three-phase multiplexing that occurred with the cycles previously discussed, this second mode of operation has two phases, an interrupt phase and a DMA request phase.

Figures 7A, 7B:
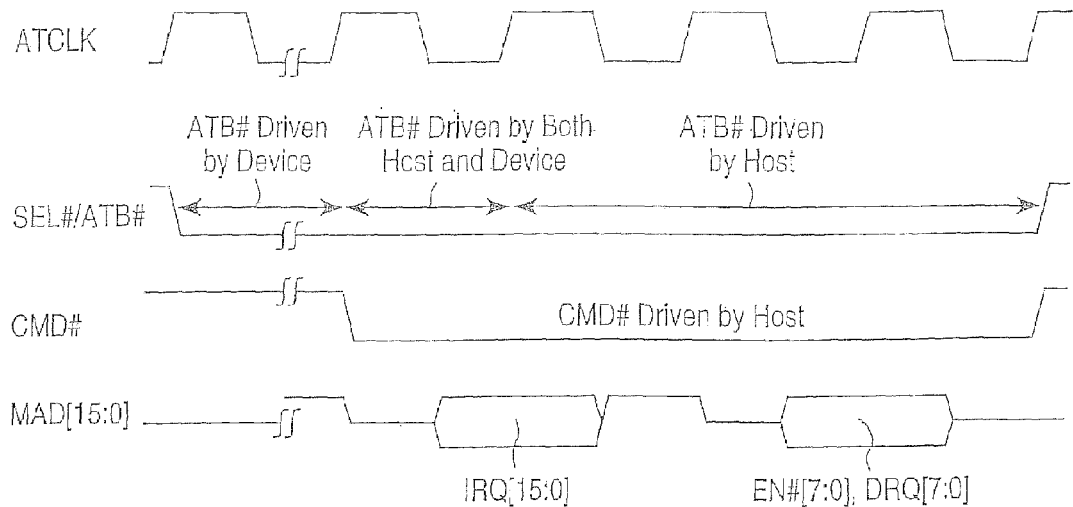
FIG. 7a is a timing diagram showing operation of the interface of FIG. 1 for performing an interrupt and DMA request drive-back cycle.
FIG. 7b shows bit definitions on bus 135 of FIG. 1 during an interrupt a DMA request drive-back cycle.

FIG. 7a illustrates the interrupt request and DMA request (IRQ and DRQ, respectively) drive-back cycles. Once it is determined that mode-2 operation is possible, peripheral device 130 may assert SEL#/ATB#. Note that during the previously discussed mode of operation (mode 1), the SEL#/ATB# signal indicated that the peripheral device 130 is claiming the current cycle on the bus. However, when ALE is low, assertion of the SEL#/ATB# signal by the peripheral device 130 acts to indicate that the host platform interface circuitry should "back off" from driving memory or I/O cycles on the bus.

If host platform interface circuitry 115 was starting a cycle, and was about to assert ALE on the next falling edge of ATCLK, once SEL#/ATB# is asserted with ALE low, the host platform interface circuitry 115, in the present embodiment, must abort the cycle and retry it later. Even if host platform interface circuitry 115 is busy and cannot respond to the drive-back request immediately, it inhibits initiation of all other I/O and DMA operations.

As soon as AT bus operations have been completed and bus 135 is available, host platform interface circuitry 115 drives MAD[15:0] high for half an ATCLK cycle from a falling edge of ATCLK, then asserts CMD# after the next rising edge of ATCLK to acknowledge that device 130 can now drive IRQ information onto the bus. The host drives ATB# low at this time. Peripheral device 130 can now drive interrupt data onto bus 135 on the next falling edge of ATCLK, driving low only those lines with IRQ activity and not actively driving high the other lines. In this way, multiple CISA devices can drive the lines in parallel. To restore an IRQ line to its inactive state, the CISA device must initiate an IRQ driveback cycle but leave the MAD line corresponding to the inactive-going IRQ high. CISA devices must track IRQ driveback cycles initiated by other CISA devices in order to maintain an active state on any IRQ line they currently control. The IRQ generation circuitry 170, which may, in different embodiments, be external to the host platform interface circuitry 115 or built into it, uses the rising edge of ATCLK, qualified by ATB# and CMD# low, to latch IRQ information. The peripheral device 130 stops driving ATB# and the host platform interface circuitry 115 controls ATB# throughout the rest of the cycle.

As shown in FIGS. 7a and 7b, for DMA requests (DRQs), peripheral device 130 drives high any MAD[15:0] lines it was driving low high for one-half an ATCLK cycle, then tri-states the lines for half an ATCLK cycle. Peripheral device 130 drives DRQ information onto MAD[7:0] and, at the same time, drives low the corresponding lines MAD[15:8] to indicate which DRQ channels have a status change to be transferred. The host side DRQ generation circuitry 170, which may, in different embodiments, be external to the host platform interface circuitry 115 or built into it, samples ATB# and CMD# active on the next rising ATCLK edge after the edge on which IRQs were sampled, and latches the DRQ information on MAD[7:0] for the channel selected. The host DRQ generation circuitry may, in different embodiments, OR the DRQs obtained with other system DRQs. The host de-asserts CMD# and ATB# on the next rising edge of the ATCLK cycle.

The desired DMA request line states are latched by host platform interface circuitry 115 and will remain in that state until cleared by another DRQ drive-back cycle. This scheme allows for both DMA single transfers and DMA block transfers. The peripheral device 130 asserts SEL#/ATB# immediately any time a DRQ line changes state (assuming the current cycle is finished). The host platform interface circuitry 115, in turn, immediately de-asserts all DRQ inputs to its DRQ generation circuitry 170, including DMA requests from ISA DMA devices, until the host platform interface circuitry 115 drives a DMA acknowledge cycle. By dynamically blocking ISA device DMA requests, any need to reassign DMA channels is eliminated.

ISA Compatibility

CISA performance is comparable with that of 16-bit ISA bus peripheral devices. It does not interfere with standard ISA operations and is compatible with ISA operations. For instance, CISA ATCLK signal 165 is compatible with the standard ISA BLCK signal; CISA ALE signal 140 is compatible with the standard ISA BALE signal; and CISA IOCHRDY signal 150 is compatible with standard ISA signal IOCHRDY. In addition, in its simplest form, CMD# 145 is the AND of the IORD#, IOWR#, MRD#, and MWR# commands on the ISA bus interface. However, compatibility for the present embodiment is based upon the following assumptions:
1. No ISA peripherals can drive the MAD bus between ISA cycles. They must stay tri-stated at this time.
2. ATCLK can be stopped only during a stop clock broadcast configuration cycle and must run at all other times.
3. No standard ISA masters on the bus are allowed access to CISA peripheral devices. Standard ISA masters are simply ignored by CISA devices since these masters cannot generate CMD# and so cannot run a CISA cycle.
4. No bus master capability is necessary on the part of the CISA peripheral device in the present embodiment. However, the presence of SEL#/ATB# and its "backoff" feature allows bus master capabilities in other embodiments.
5. On receipt of an ATB# request, the CISA host must immediately inhibit all system DRQ activity until the drive-back cycle is complete. Otherwise, unwanted DMA cycles could occur.

Shared Speaker Signal

Figure 8:
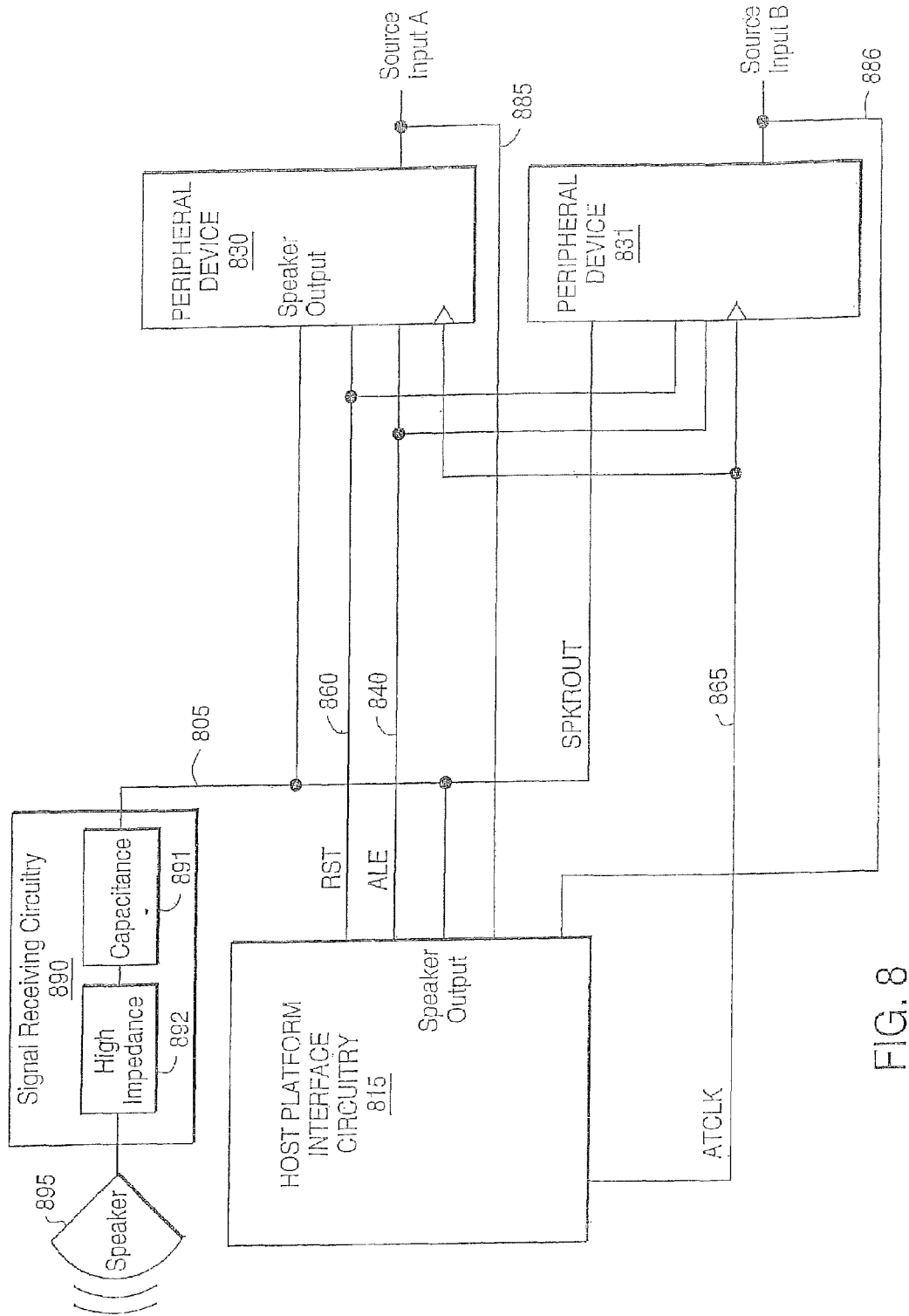
FIG. 8 is a functional block diagram of a shared speaker output line in accordance with the present invention.

In one embodiment of the present invention, an additional digital speaker output signal (SPKROUT) is provided. Unlike conventional schemes which generally require that the digital audio outputs from each device be tied together with XOR logic, the present invention allows the digital audio outputs of any number of devices to be combined and shared, as shown in FIG. 8. In addition SPKROUT 805 is shared among devices in the present invention without the use of open-collector outputs. Speaker data output is typically a signal driven in both the low-to-high and high-to-low directions, making an open-collector output on the speaker data output lines insufficient in that there is no guarantee that any particular speaker output line from a device will be left in a high or tri-stated condition. If one open-collector device leaves the speaker output signal low, no other open-collector device connected on the line could toggle the signal from low to high. In addition, open-collector outputs tend to consume excessive power.

Referring to FIG. 8, SPKROUT 805 is coupled between peripheral device 830, peripheral device 831, and host platform interface circuitry 815. SPKROUT 805 is further coupled to signal receiving circuitry 890 which in turn is coupled to speaker 895. Peripheral devices 830 and 831 also receive source input A 885 and source input B 886, respectively. Source input A 885 and source input B 886 are additionally coupled to host platform interface circuitry 815. RST 860, ALE 840, and ATCLK 865 are additionally coupled between host platform interface circuitry 815 and each peripheral device 830 and 831.

Figure 9A:
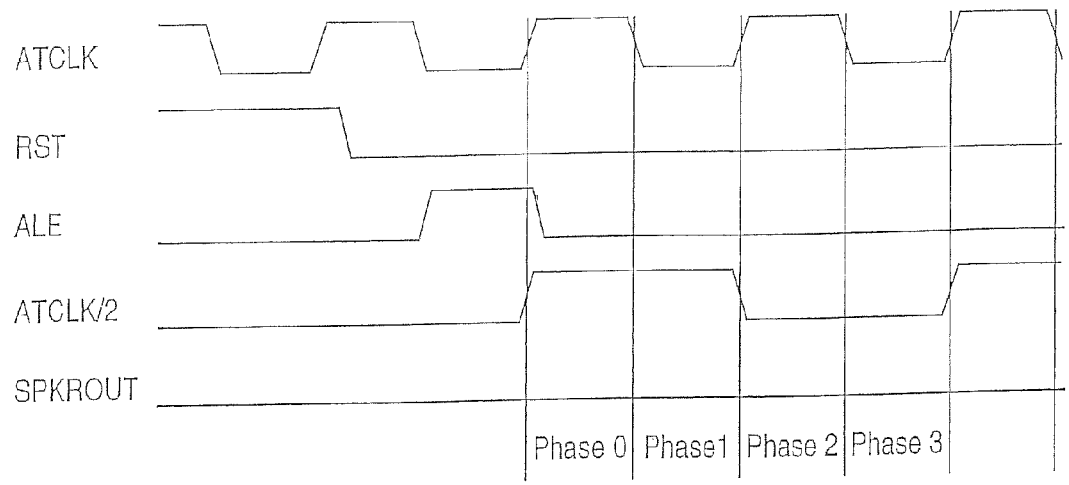
FIG. 9a is a timing diagram showing initialization and synchronization for use of the shared speaker output line of FIG. 8 in accordance with the present invention.

In accordance with one embodiment of the invention, to share SPKROUT 805 between peripheral device 830, peripheral device 831, and host platform interface circuitry 815, the SPKROUT output of each device is first initialized and each device is synchronized. To initialize, the SPKROUT outputs of each device are tri-stated at hard reset time and remain tri-stated until individually enabled. To synchronize, referring to FIG. 9a, on the first ALE generated by host platform interface circuitry 805, peripheral devices 830 and 831 will synchronize to ATCLK and derive the signal ATCLK/2 internally. Four distinct phases result: Phase 0 when ATCLK is high and ATCLK/2 is high; Phase 1 when ATCLK is low and ATCLK/2 is high; Phase 2 when ATCLK is high and ATCLK/2 is low; and Phase 3 when ATCLK is low and ATCLK/2 is low.

Figure 9B:
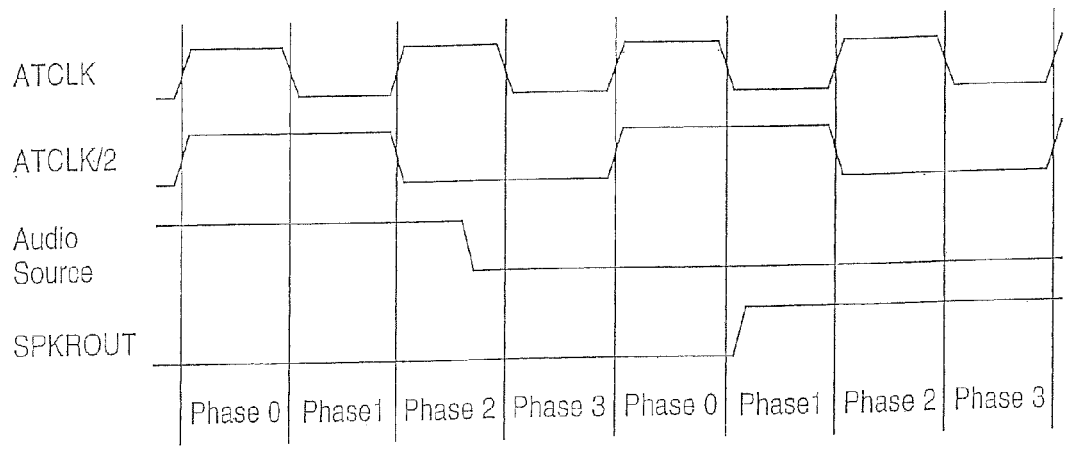
FIG. 9b is a timing diagram showing the utilization of the shared speaker output signal of FIG. 8 in accordance with the present invention.

Once initialized and synchronized, a signal can be driven on the SPKROUT 805 line as shown in FIG. 9b. On the rising ATCLK edge starting Phase 0 a peripheral device 830 wishing to drive a signal on SPKROUT 805 samples the state of SPKROUT 805. Host platform interface circuitry 815 also samples the state of SPKROUT 805. Both peripheral device 830 and host platform interface circuitry 815 maintain the speaker output of each device tri-stated during the remainder of Phase 0. On the falling edge of the ATCLK edge starting Phase 1 peripheral device 830 and host platform interface circuitry 815 each sample digital audio source input (source input A) 885. During Phase 1, if the signal on source input A 885 sampled on the falling ATCLK edge has changed since a previous phase 1 in which it was sampled, both peripheral device 830 and host platform interface circuitry 815 toggle the signal on SPKROUT 805. Toggling occurs by driving the opposite logic value (0 or 1) of the SPKROUT value sampled in Phase 0 by peripheral device 830 and host platform interface device 831.

On the rising ATCLK edge starting phase 2, both peripheral device 830 and host platform interface circuitry 815 tri-state their respective speaker outputs and maintain them tri-stated during the remainder of Phase 2. On the rising ATCLK edge starting Phase 2, host platform interface circuitry 815 additionally samples the state of SPKROUT 805. On the falling ATCLK edge starting Phase 3, host platform interface circuitry 805 drives SPKROUT to the value of SPKROUT sampled in Phase 2 by host platform interface circuitry 815. Host platform interface circuitry 815 maintains SPKROUT driven with this value for the remainder of Phase 3 while peripheral device 830 maintains its speaker output tri-stated.

Although two devices will rarely simultaneously require use of SPKROUT, should simultaneous demands occur, the scheme of the present invention eliminates contention. Both devices will sample the SPKROUT line and should a toggle be required, both would toggle the line in the same direction.

It is possible that neither peripheral device 830 nor host platform interface circuitry 815 will drive the SPKROUT 805 line for up to 1.5 ATCLK cycles. Thus, shared SPKROUT line 805 depends on an RC time constant large enough that the signal on SPKROUT 805 will not change its level any appreciable amount across a period of 1.5 ATCLKs. In one embodiment of the invention, the bus capacitance inherent on the SPKROUT line 805 will be sufficient to act as a capacitive logic level holding mechanism 891. However, in some instances, a larger capacitance may be needed to hold the logic level, the value of which will be apparent to one of ordinary skill in the art.

Further, in the present embodiment, speaker 895 is an 8 ohm speaker. Connecting speaker 895 directly to line 805 would cause the line to begin a transition when it was tri-stated. Therefore, speaker 895 should be further coupled with a high impedance input 892, which may be a simple buffer in one embodiment of the invention, or a high impedance amplifier circuit in another embodiment of the invention.

During a stop clock cycle, described above, peripheral device 830 tri-states its speaker output during the period during which both STPACTV and STPRDY are high (see FIG. 6a). Host platform interface circuitry 815 drives SPKROUT 805 low. In another embodiment of the invention, host platform interface circuitry 815 tri-states its speaker output rather than driving SPKROUT 805 low. Even during such a stop clock cycle, however, peripheral device 830 remains synchronized to the correct phase of ATCLK and does not resynchronize on the next ALE.

Automatic Voltage Threshold Detection

CISA devices in accordance with the invention can utilize either a 5v bus or a 3.3v bus and can detect which threshold is being used automatically, without using external circuitry. To detect a 5v threshold, host platform interface circuitry 115 asserts the ALE signal to a logical high when RST also goes to a logical high. The host keeps ALE asserted for at least one-half ATCLK cycle and at most one ATCLK cycle after RST goes to a logical low. To automatically detect a 3.3v threshold, host platform interface circuitry 115 keeps the ALE signal at a logical low when RST goes to a logical high and maintains ALE at a logical low for at least one-half ATCLK cycles after RST goes to a logical low.

The invention has been described with respect to particular embodiments thereof, and it will be understood that numerous modifications are possible within the scope of the invention as set forth in the claims.

What is claimed is:

1. A computer system comprising:
   a host platform;
   a peripheral device; and
   a plurality of signal lines coupling the host platform to said peripheral device, said plurality of signal lines comprising:
   an address-data bus to carry in a multiplexed manner address information for a first cycle, data information for said first cycle, at least said address information and said data information being carried on the same signal lines at different times, and cycle definition information for said first cycle, said cycle definition information being carried on the same signal lines at different times with said address information and/or said data information, said cycle definition information including a cycle type and a cycle direction, said cycle type identifying at least a memory cycle or an I/O cycle, said cycle direction identifying at least a read direction or a write direction.

* * * * *